United States Patent
Shao et al.

(10) Patent No.: US 12,422,106 B2
(45) Date of Patent: Sep. 23, 2025

(54) METHOD AND INTERNET OF THINGS (IOT) SYSTEM FOR ADJUSTING PRESSURES OF SMART GAS PIPELINE NETWORKS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/788,012

(22) Filed: Jul. 29, 2024

(65) Prior Publication Data
US 2024/0392929 A1  Nov. 28, 2024

Related U.S. Application Data (63) Continuation of application No. 18/518,478, filed on Nov. 23, 2023, now Pat. No. 12,072,066.

(30) Foreign Application Priority Data

Oct. 26, 2023 (CN) .......................... 202311396477.1

(51) Int. Cl.
*F17D 5/00* (2006.01)
*G16Y 10/35* (2020.01)
(Continued)

(52) U.S. Cl.
CPC .............. *F17D 5/005* (2013.01); *G16Y 10/35* (2020.01); *G16Y 20/30* (2020.01); *G16Y 40/10* (2020.01); *G16Y 40/35* (2020.01)

(58) Field of Classification Search
CPC ........ F17D 5/005; G16Y 10/35; G16Y 20/30; G16Y 40/10; G16Y 40/35
See application file for complete search history.

(56) References Cited

U.S. PATENT DOCUMENTS 11,959,789 B2  4/2024 Shao et al.
2009/0326865 A1  12/2009 Ziegel et al.
(Continued)

FOREIGN PATENT DOCUMENTS

CN  108730773 A  11/2018
CN  110276496 B  5/2020
(Continued)

OTHER PUBLICATIONS

Cen, Kang et al., Potential Analysis and Fine Management of Natural Gas Pipeline System, Science and Technology for Development, 16(6): 721-727, 2020.
(Continued)

*Primary Examiner* — Eric S. McCall
(74) *Attorney, Agent, or Firm* — METIS IP LLC (57) ABSTRACT

The embodiment of the present disclosure provides a method and an Internet of Things (IoT) system for adjusting a pressure of a smart gas pipeline network. The method includes: obtaining gas delivery parameters of a preset point in a gas pipeline branch; obtaining gas data corresponding to the gas pipeline branch; determining an estimated value of a gas loss rate of the gas pipeline branch; determining a confidence level of the estimated value; in response to the confidence level satisfying an update condition, updating the preset point to determine an update point; determining an update confidence level; determining a composite confidence level of the estimated value; determining an adjustment factor; determining the gas loss rate; and in response to the gas loss rate satisfying a first predetermined condition, determining a target operating parameter, and adjusting a
(Continued)

pressure of a gas network based on the target operating parameter.

16 Claims, 5 Drawing Sheets

(51) Int. Cl.
*G16Y 20/30* (2020.01)
*G16Y 40/10* (2020.01)
*G16Y 40/35* (2020.01)

(56) References Cited

U.S. PATENT DOCUMENTS

| | | |
|---|---|---|
| 2023/0213370 A1 | 7/2023 | Shao et al. |
| 2023/0228364 A1 | 7/2023 | Shao et al. |
| 2023/0280264 A1 | 9/2023 | Shao et al. |
| 2023/0366710 A1 | 11/2023 | Shao et al. |
| 2024/0125622 A1 | 4/2024 | Shao et al. |

FOREIGN PATENT DOCUMENTS

| | | |
|---|---|---|
| CN | 114398987 A | 4/2022 |
| CN | 114740159 A | 7/2022 |
| CN | 115796408 A | 3/2023 |
| CN | 116070771 A | 5/2023 |
| KR | 20140039107 A | 4/2014 |

OTHER PUBLICATIONS

Li, Xi, Research on Urban Gas Pipeline Integrity Management and Technical System, Chemical Engineering Management, 2016, 2 pages.

Shao, Zhehua et al., Research on Urban Gas Demand-Side Gas Supervision System Based on Gas Meter Internet of Things Technology, Internet of Things Technology, 2021, 5 pages.

Pang, Huiwen et al., Lost Circulation Prediction Based on Machine Learning, Journal of Petroleum Science and Engineering, 2022, 17 pages.

Yang, Kai, Research on the Multi-Factor Coupling Disaster Mechanism and Disaster Control of Urban Gas Pipeline Leakage, Chinese Doctoral Dissertations Full-text Database, 2016, 191 pages.

METHOD AND INTERNET OF THINGS (IOT) SYSTEM FOR ADJUSTING PRESSURES OF SMART GAS PIPELINE NETWORKS

CROSS-REFERENCE TO RELATED APPLICATION

This application is a continuation of U.S. application Ser. No. 18/518,478, filed on Nov. 23, 2023, which claims priority of Chinese Patent Application No. 202311396477.1, filed on Oct. 26, 2023, the contents of each of which are hereby incorporated by reference.

TECHNICAL FIELD

The present disclosure relates to the technical field of the Internet of Things (IoT), and in particular, to a method and an Internet of Things (IoT) system for adjusting a pressure of a smart gas pipeline network.

BACKGROUND

With the increasing application of gas in daily life, gas companies deliver gas to various users through pipelines, and gas is lost during transportation or usage. The specific gas loss depends on various factors. Therefore, reducing gas loss requires the formulation of corresponding energy-saving measures and management strategies based on specific circumstances.

In response to the aforementioned problem, CN110276496B proposes a cloud computing-based method, system, and gas appliance for processing gas energy consumption data. The application utilizes cloud computing to analyze and obtain optimized usage plans for each type of gas appliance, and uses a gas usage difference threshold to determine the compliance of the machine model and the optimized reference plan. However, the solution only considers optimizing gas loss caused during the usage of gas appliances, without considering the gas loss during transportation in the gas pipeline network.

Therefore, it is desired to provide a method and an Internet of Things (IoT) system for adjusting a pressure of a smart gas pipeline network, which can help formulate corresponding energy-saving measures and management strategies based on the transportation in the gas pipeline network.

SUMMARY

The present disclosure provides a method for adjusting a pressure of a smart gas pipeline network. The method being executed by a smart gas device management platform of an Internet of Things (IoT) system for adjusting a pressure of a smart gas pipeline network. The IoT system includes a smart gas user platform, a smart gas service platform, the smart gas device management platform, a smart gas sensor network platform, and a smart gas object platform, the smart gas object platform is configured to obtain gas delivery parameters and gas data, and upload the gas delivery parameters and the gas data to a smart gas data center of the smart gas device management platform through the smart gas sensor network platform. The method includes: obtaining gas delivery parameters of a preset point in a gas pipeline branch; obtaining gas data corresponding to the gas pipeline branch, the gas data including at least a total amount of gas supply and a total amount of gas consumption; determining an estimated value of a gas loss rate of the gas pipeline branch based on the total amount of gas supply and the total amount of gas consumption; determining a confidence level of the estimated value based on the gas data and the gas delivery parameters; in response to the confidence level satisfying an update condition, updating the preset point to determine an update point; determining an update confidence level through a first prediction model based on the update point, the first prediction model being a machine learning model and being obtained based on a training of an initial feature extraction layer and an initial confidence level prediction layer; determining a composite confidence level of the estimated value based on at least one of the confidence level or the update confidence level through a weighted average; determining an adjustment factor based on the composite confidence level; determining the gas loss rate based on the estimated value and the adjustment factor, and sending the gas loss rate to the smart gas user platform through the smart gas service platform; and in response to the gas loss rate satisfying a first predetermined condition, determining a target operating parameter, and adjusting a pressure of a gas network based on the target operating parameter.

The present disclosure also provides an Internet of Things system for adjusting a pressure of a smart gas pipeline network. The Internet of Things system includes: a smart gas user platform, a smart gas service platform, a smart gas device management platform, a smart gas sensor network platform, and a smart gas object platform. The smart gas object platform is configured to obtain gas delivery parameters and gas data, and upload the gas delivery parameters and the gas data to a smart gas data center of the smart gas device management platform through the smart gas sensor network platform. The smart gas device management platform is configured to: obtain gas delivery parameters of a preset point in a gas pipeline branch; obtain gas data corresponding to the gas pipeline branch, the gas data including at least a total amount of gas supply and a total amount of gas consumption; determine an estimated value of a gas loss rate of the gas pipeline branch based on the total amount of gas supply and the total amount of gas consumption; determine a confidence level of the estimated value based on the gas data and the gas delivery parameters; in response to the confidence level satisfying an update condition, update the preset point to determine an update point; determine an update confidence level through a first prediction model based on the update point, the first prediction model being a machine learning model and being obtained based on a training of an initial feature extraction layer and an initial confidence level prediction layer; determine a composite confidence level of the estimated value based on at least one of the confidence level or the update confidence level through a weighted average; determine an adjustment factor based on the composite confidence level; determine the gas loss rate based on the estimated value and the adjustment factor, and send the gas loss rate to the smart gas user platform through the smart gas service platform; and in response to the gas loss rate satisfying a first predetermined condition, determine a target operating parameter, and adjust a pressure of a gas network based on the target operating parameter.

By the above method, it is possible to take into account the effects of different pressures, temperatures, gas flow rates, and so on, on the gas data, to improve the reliability of the determined gas loss rate, and thus to determine the appropriate pressure for gas transportation.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Aiming at a problem of gas loss control, CN110276496B currently provides a cloud computing-based gas energy data processing method, a system, and a gas appliance. However, the optimization scheme provided by CN110276496B is only for the usage of the gas appliance, and it is not possible to adjust operating parameters (e.g., a pressure, a temperature, and a gas flow rate, etc.) of the gas pipeline during transportation.

In view of the foregoing, in some embodiments of the present disclosure, gas delivery parameters of a preset point in a gas pipeline branch and gas data corresponding to the gas pipeline branch are obtained; a gas loss rate of the gas pipeline branch is determined based on the gas delivery parameters and the gas data; and in response to the gas loss rate satisfying a first predetermined condition, a pressure of a gas pipeline network is adjusted, thereby realizing gas loss control of the smart gas platform.

Figure 1:
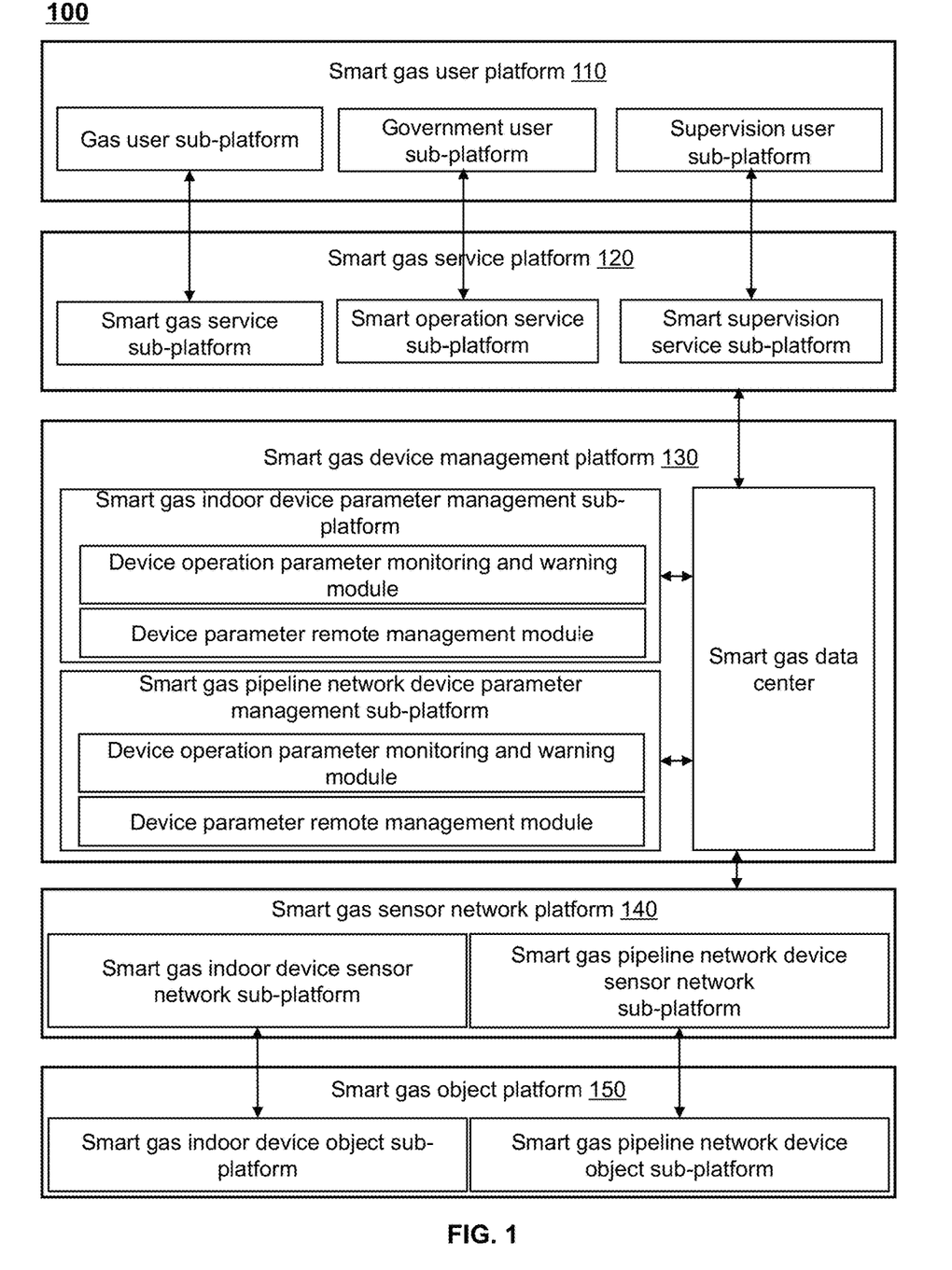
FIG. 1 is an exemplary structural diagram of an Internet of Things (IoT) system for gas loss control based on a smart gas platform according to some embodiments of the present disclosure.

FIG. 1 is an exemplary structural diagram of an Internet of Things (IoT) system for gas loss control based on a smart gas platform according to some embodiments of the present disclosure.

As shown in FIG. 1, in some embodiments, an IoT system 100 for gas loss control based on a smart gas platform based on a smart gas platform includes a smart gas user platform 110, a smart gas service platform 120, a smart gas device management platform 130, a smart gas sensor network platform 140, and a smart gas object platform 150.

The smart gas user platform 110 is a platform for interacting with a user. In some embodiments, the user platform may be configured as a terminal device.

In some embodiments, the smart gas user platform 110 may include a plurality of smart gas user sub-platforms, e.g., a gas user sub-platform, a government user sub-platform, and a supervision user sub-platform.

In some embodiments, the smart gas user platform 110 may send a gas regulator station operation parameter management information query instruction to the smart gas service sub-platform based on the gas user sub-platform. In some embodiments, the smart gas user platform 110 may receive, based on the government user sub-platform, the gas regulator station operation parameter management information uploaded by a smart operation service sub-platform.

The smart gas service platform 120 is a platform for receiving and transmitting data and/or information such as advisory information, query instructions, and troubleshooting solutions. The smart gas service platform may obtain gas regulator station operation parameter management information or the like, from the smart gas device management platform (e.g., a smart gas data center) and send it to the smart gas user platform.

In some embodiments, the smart gas service platform 120 may include a plurality of smart gas service sub-platforms, such as a smart gas consumption service sub-platform, a smart operation service sub-platform, and a smart supervision service sub-platform. Different smart gas service sub-platforms correspond to and interact with different smart gas user sub-platforms.

The smart gas device management platform 130 is a platform that integrates and coordinates the connection and collaboration between various functional platforms, aggregates all the information of the Internet of Things (IoT), and provides the IoT operation system with the functions of perception management and control management.

In some embodiments, the smart gas device management platform 130 may include a smart gas indoor device parameter management sub-platform, a smart gas pipeline network device parameter management sub-platform, and a smart gas data center (hereinafter referred to as the data center). Wherein, the management sub-platforms are independent of each other. In some embodiments, the respective management sub-platforms interact with the data center in both directions. The data center may aggregate, and store, at least a portion of the operational data of the IoT system. In some embodiments, the smart gas device management platform may interact with the smart gas service platform 120 and the smart gas sensor network platform 140 via the data center for information.

In some embodiments, each of the management sub-platforms may include a device operation parameter monitoring and warning module, and a device parameter remote management module. In some embodiments, the device operation parameter monitoring and warning module may view device operation parameter historical data and real-time data, and conduct monitoring and warning according to a preset threshold.

In some embodiments, the smart gas device management platform 130 interacts with the upper-layer smart gas service platform 120 and the lower-layer smart gas sensor network platform 140 through the data center. In some embodiments, the smart gas device management platform 130 may receive, via the data center, the gas regulator station operation parameter management information query sent by the smart gas service platform 120. In some embodiments, the smart gas device management platform 130 may send an instruction for obtaining data related to the operation of the gas regulator station to the smart gas sensor network platform 140 via the data center.

In some embodiments, the smart gas device management platform 130 may receive, via the data center, data related to the operation of the gas regulator station uploaded by the smart gas sensor network platform 140.

In some embodiments, the smart gas device management platform 130 may also be used to adjust the pressure of the gas pipeline network. Further description of the smart gas device management platform can be found elsewhere in the present disclosure, such as in FIG. 2.

In some embodiments, the data center sends data related to the operation of the gas regulator station to the smart gas pipeline network device parameter management sub-platform for analysis and processing. In some embodiments, the smart gas pipeline network device parameter management sub-platform sends the analyzed and processed data to the data center. In some embodiments, the data center may send the summarized, processed data to the smart gas service platform 120.

The smart gas sensor network platform 140 is a functional platform for managing sensor communications. In some embodiments, the smart gas sensor network platform 140 may be connected to the smart gas device management platform 130 and the smart gas object platform 150 to realize the functionality of the sensor communications.

In some embodiments, the smart gas sensor network platform 140 may include a smart gas indoor device sensor network sub-platform and a smart gas pipeline network device sensor network sub-platform. In some embodiments, the smart gas indoor/pipeline network device sensor network sub-platform may correspond to the smart gas indoor/pipeline network device object sub-platform for obtaining data related to an indoor device and/or a pipeline network device.

In some embodiments, the smart gas sensor network platform 140 may interact with the smart gas object platform 150. For example, the smart gas sensor network platform 140 may receive data related to the operation of each gas regulator station uploaded by the smart gas object platform 150. As another example, the smart gas sensor network platform 140 may send an instruction for obtaining the data related to the operation of the gas regulator station to the smart gas object platform 150.

The smart gas object platform 150 is a functional platform for sensory information generation. In some embodiments, the smart gas object platform 150 may include at least one gas device. Wherein, the gas device is configured with a unique identifier, which may be used to control the gas device deployed in different areas of the city; the gas device may also include indoor device and pipeline network device.

In some embodiments, the smart gas object platform 150 may include a smart gas indoor device object sub-platform, and a smart gas pipeline network device object sub-platform. In some embodiments, the smart gas indoor/pipeline network device object sub-platform may correspond to the smart gas indoor/pipeline network device sensor network sub-platform, and the data related to the operation of the indoor/pipeline network device is uploaded via the indoor/pipeline network The data related to the operation of the indoor/pipeline network device is uploaded to the data center through the indoor/pipeline network device sensor network sub-platform.

It should be noted that the above description of the IoT system for gas loss control based on the smart gas platform and its constituent platforms is only for the convenience of the description, and it does not limit the present disclosure to the scope of the cited embodiments. It is to be understood that for those skilled in the art, after understanding the principle of the IoT system, it may be possible to arbitrarily combine individual modules or constitute a sub-system to be connected with other modules without departing from the principle.

Figure 2:
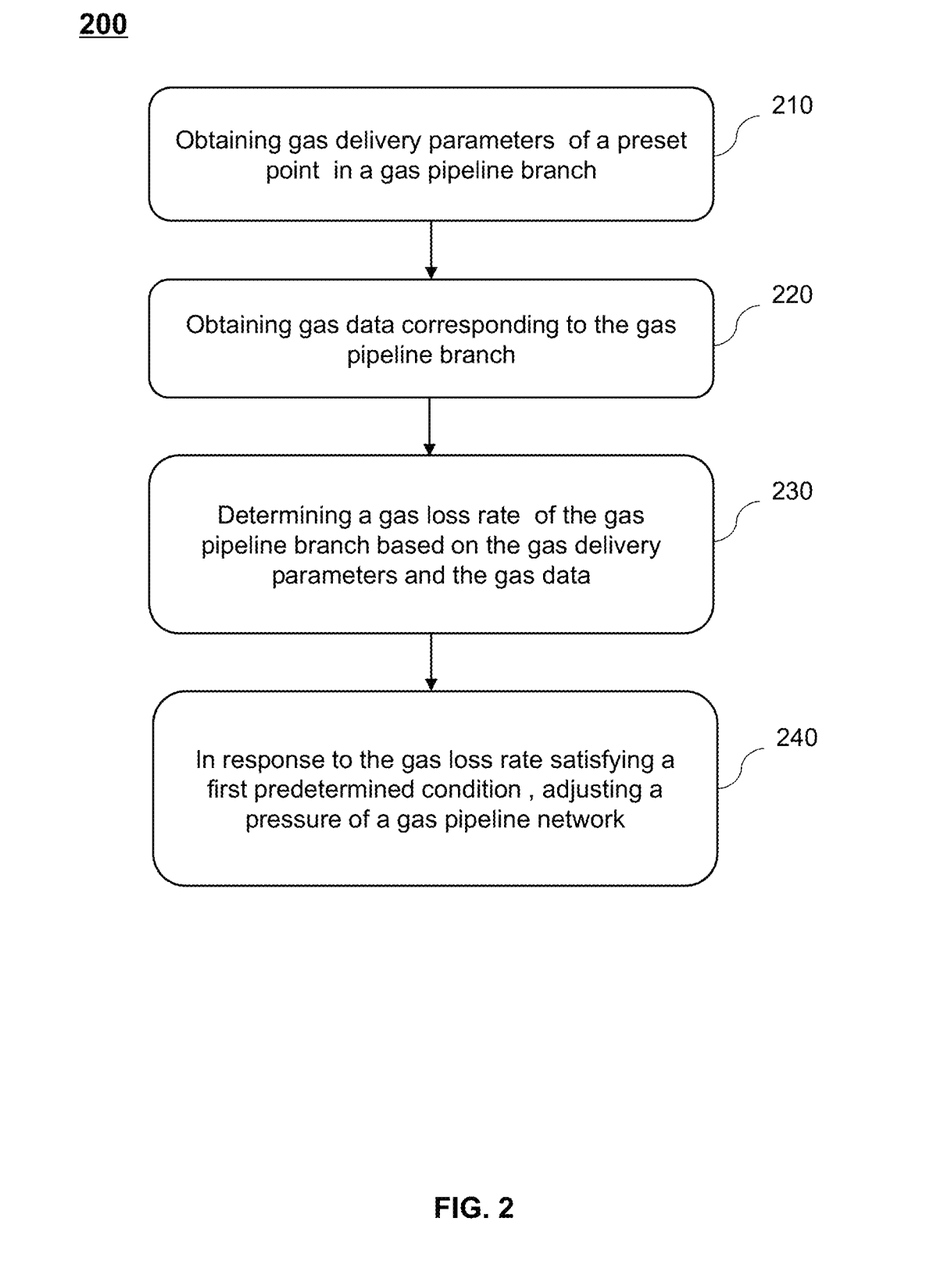
FIG. 2 is an exemplary flowchart of a method for gas loss control based on a smart gas platform according to some embodiments of the present disclosure.

FIG. 2 is an exemplary flowchart of a method for gas loss control based on a smart gas platform according to some embodiments of the present disclosure. In some embodiments, process 200 may be performed based on a smart gas device management platform. As shown in FIG. 2, process 200 includes the following steps.

Step 210, obtaining gas delivery parameters of a preset point in a gas pipeline branch.

The gas pipeline branch may be divided based on the gas pipeline network. The gas pipeline network consists of at least one gas pipeline branch.

The preset point refers to a designated point on the gas pipeline branch that is preset in sets for deploying sensors, each set of preset points includes at least one monitoring point.

The gas delivery parameters are operating parameters of the gas pipeline network, such as a pressure, a temperature, and a gas flow rate of gas delivery.

In some embodiments, the gas delivery parameters may be obtained through the smart gas pipeline network device sensor network sub-platform. For example, the smart gas pipeline network device sensor network sub-platform may obtain the gas delivery parameters from the smart gas pipeline network device object sub-platform and transmit the gas delivery parameters to the smart gas device management platform.

Step 220, obtaining gas data corresponding to the gas pipeline branch.

The gas data refers to data related to gas supply and demand, such as gas supply amount, gas consumption amount, and a gas flow rate.

In some embodiments, gas data for any one of gas pipeline branches may be obtained through the smart gas indoor device sensor network sub-platform and/or the smart gas pipeline network device sensor network sub-platform. For example, the smart gas indoor device sensor network sub-platform may obtain gas consumption amount of a user from the smart gas indoor device object platform and transmit the gas consumption amount to the smart gas device management platform. As another example, the smart gas pipeline network device sensor network sub-platform may obtain gas supply amount from the smart gas pipeline network device object platform and transmit the gas supply amount to the smart gas device management platform.

In some embodiments, the gas data may be obtained based on readings from a gas metering device. In some embodiments, the gas data includes at least a total amount of gas supply and the total amount of gas consumption.

The total amount of gas supply is a total amount of gas supply in the gas pipeline branch, which may be obtained based on the readings of a first gas metering device of the gas pipeline branch. The first gas metering device is a metering device for measuring the total amount of gas supply of the gas pipeline branch, and is configured in the gas pipeline network.

The total amount of gas consumption is a total amount of gas consumption in a gas pipeline branch, which may be obtained based on a sum of readings of all second gas metering devices in the gas pipeline branch. The second gas metering device is a metering device for measuring the total amount of gas consumption of each gas user in the gas pipeline branch, and is configured at a gas user terminal.

Theoretically, in the absence of gas losses, the reading of the first gas metering device is equal to the sum of readings of the all second gas metering devices. Therefore, the gas loss rate may be calculated from the total amount of gas supply and the total amount of gas consumption.

Step 230, determining a gas loss rate of the gas pipeline branch based on the gas delivery parameters and the gas data.

The gas loss rate is used to characterize a degree of gas loss during delivery. During the delivery of gas, there is a certain loss due to pipeline friction, heat loss, evaporation, pressure, leakage, and other reasons. The gas loss rate may be a quantitative value that represents the loss, etc.

During the gas measurement process, measurement errors may occur due to accuracy or calibration problems of the measuring device, resulting in differences between the gas measurement results and the actual situation.

In some embodiments, the smart gas device management platform may calculate the gas loss rate of the pipeline through dividing the amount of gas loss by the total amount of gas supply of the pipeline. The amount of gas loss may be determined by calculating a difference between the total amount of gas supply and the total amount of gas consumption.

In some embodiments, the smart gas device management platform may determine a total amount of gas supply of a gas pipeline branch based on one or more gas distribution plans during various time periods. The gas distribution plan may be determined through a manual input. In some embodiments, the smart gas device management platform may obtain the reading of the first gas metering device and determine the readings the total amount of gas supply.

In some embodiments, the smart gas device management platform may obtain readings from the second gas metering devices, calculate the sum of the readings, and determine the sum as the total amount of gas consumption.

In some embodiments, the smart gas device management platform may determine an estimated gas loss rate of the gas pipeline branch based on the total amount of gas supply and the total amount of gas consumption; determine a confidence level of the estimated gas loss rate based on the gas data and the gas delivery parameters; and determine the gas loss rate based on the estimated gas loss rate and the confidence level.

The estimated gas loss rate refers to a gas loss rate estimated based on the readings of the gas metering devices.

The estimated gas loss rate may be obtained in a variety of ways. In some embodiments, the smart gas device management platform may determine the estimated gas loss rate based on a prior determination of the gas loss rate, the total amount of gas supply, and the total amount of gas consumption.

The confidence level of the estimated gas loss rate is a measure of an estimated accuracy of the gas loss rate. The higher the confidence level is, the higher the estimated accuracy may be. In some embodiments, the confidence level may be expressed as a numerical value, a percentage, a fraction, or the like.

In some embodiments, the smart gas device management platform may perform statistical analysis on the gas data and the gas delivery parameters within historical pipeline delivery data to determine performance parameters of different gas metering devices, historical maintenance data of the gas metering devices, a correspondence between the gas delivery parameters and the confidence level of the estimated gas loss rate, and determine a confidence level of the estimated gas loss rate corresponding to the gas data and gas delivery parameters in a current time period based on the correspondence.

The performance parameters are performance parameters of the gas metering device. For example, the performance parameters may include a range, a sensitivity, an accuracy, a resolution, a bandwidth, or the like.

The historical maintenance data is data related to historical maintenance records of the gas metering device.

In some embodiments, the smart gas device management platform may also determine the confidence level based on the gas data and the gas delivery parameters via a first prediction model. For more information on determining the confidence level via the first prediction model, please see the description related to FIG. 3.

In some embodiments, the smart gas device management platform may determine the gas loss rate based on the confidence level through vector matching. For example, the smart gas device management platform may construct a to-be-matched vector based on a sequence of confidence levels, determine a historical vector that meets a matching condition in a database based on the to-be-matched vector, identify the historical vector that meets the matching condition as the target vector, and determine a reference gas loss rate corresponding to the target vector as the current gas loss rate. The matching condition refers to a judgment condition used to determine the target vector. In some embodiments, the matching condition may include that the vector distance between the to-be-matched vector and the historical vector is less than a distance threshold, the vector distance is the shortest, or the like. The vector distance may be an Euclidean distance, a cosine distance, or the like.

The sequence of the confidence levels is a sequence constructed based on the confidence levels of the estimated gas loss rate corresponding to a plurality of preset points. The historical vector may be constructed based on a plurality of historical sequences of the confidence levels, each of which is associated with a corresponding reference gas loss rate, which may be the actual gas loss rate in the historical data.

Figure 4:
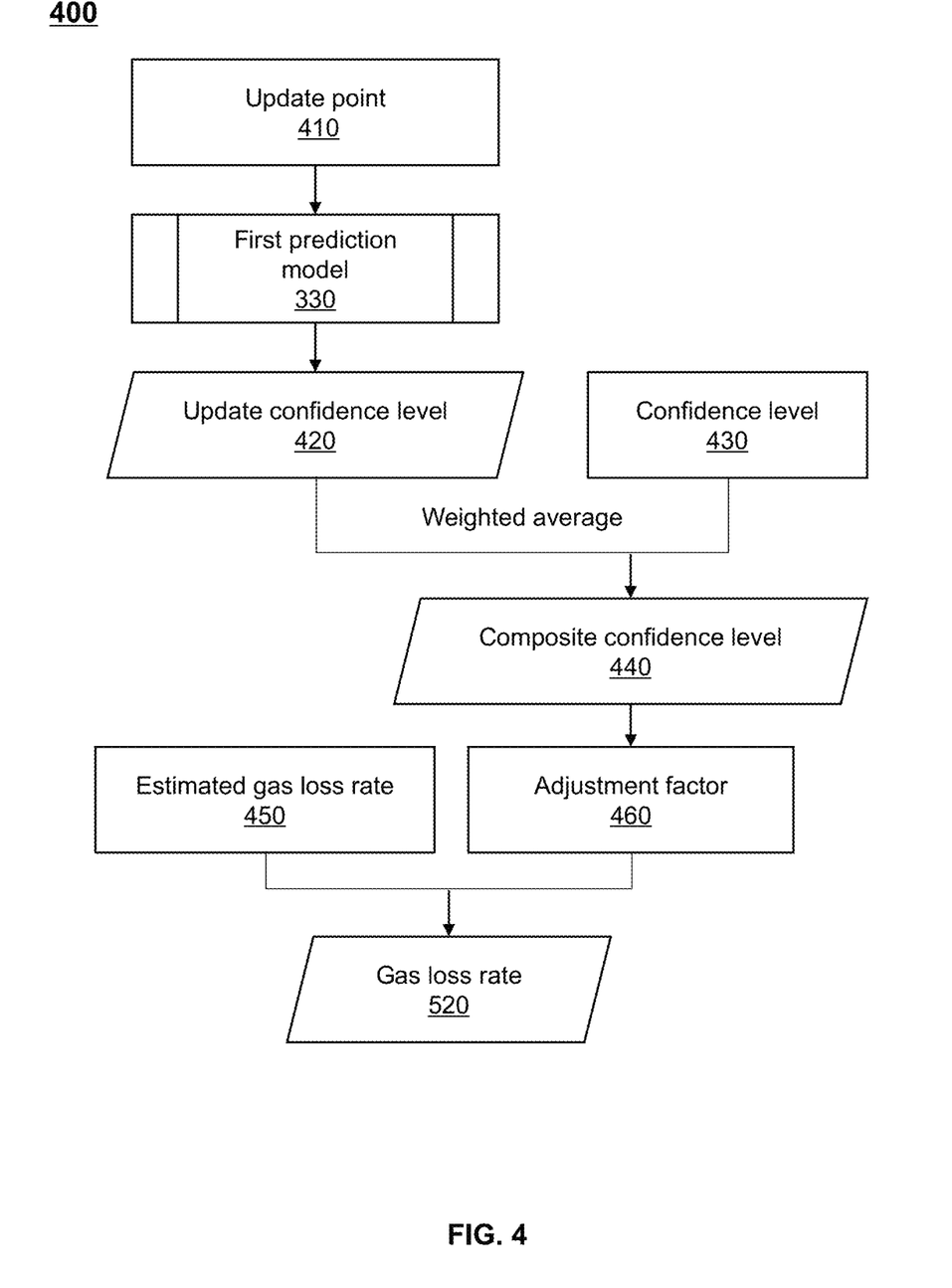
FIG. 4 is a schematic diagram of determining a gas loss rate according to some embodiments of the present disclosure.

In some embodiments, the smart gas device management platform may also update the preset point, obtain an update confidence level, and determine the gas loss rate based on the confidence level and/or the update confidence level, as further described in FIG. 4 and its related description.

In some embodiments of the present disclosure, the estimated gas loss rate can be corrected by determining the confidence level of the estimated gas loss rate in order to obtain a more accurate gas loss rate.

In some embodiments, the smart gas device management platform may determine the gas loss rate through a predetermined manner based on a confidence level and/or an updated confidence level, and more descriptions may be found in the related description of FIG. 4.

Step 240, in response to the gas loss rate satisfying a first predetermined condition, adjusting a pressure of the gas pipeline network.

The first predetermined condition is a determination condition for evaluating whether or not to adjust the pressure of the gas pipeline network. For example, the first predetermined condition may include that the gas loss rate is greater than a loss threshold. The loss threshold may be a system default, a manual preset, etc.

In some embodiments, the first predetermined condition may include a gas loss rate of a single gas pipeline branch being greater than a first threshold, a weighted average of gas loss rates of a plurality of gas pipeline branches being greater than a second threshold, etc. For more related descriptions, refer to FIG. 4.

In some embodiments, the smart gas device management platform may adjust the pressure of the gas pipeline network in response to the gas loss rate satisfying the first predetermined condition in a variety of ways. For example, the smart gas device management platform may adjust the pressure based on a correspondence between the gas loss rate and the pressure. The correspondence between the gas loss rate and the pressure may be set based on actual needs.

In some embodiments of the present disclosure, the reliability of the determined gas loss rate can be improved by considering the effects of different pressures, temperatures, gas flow rates, or the like, on the gas data, thereby facilitating the determination of a more accurate gas delivery pressure.

It should be noted that the foregoing description of the process in question is for the purpose of exemplification and illustration only and does not limit the scope of application of the present disclosure. For those skilled in the art, various corrections and changes to the process can be made under the guidance of the present disclosure. However, these corrections and changes remain within the scope of the present disclosure.

Figure 3:
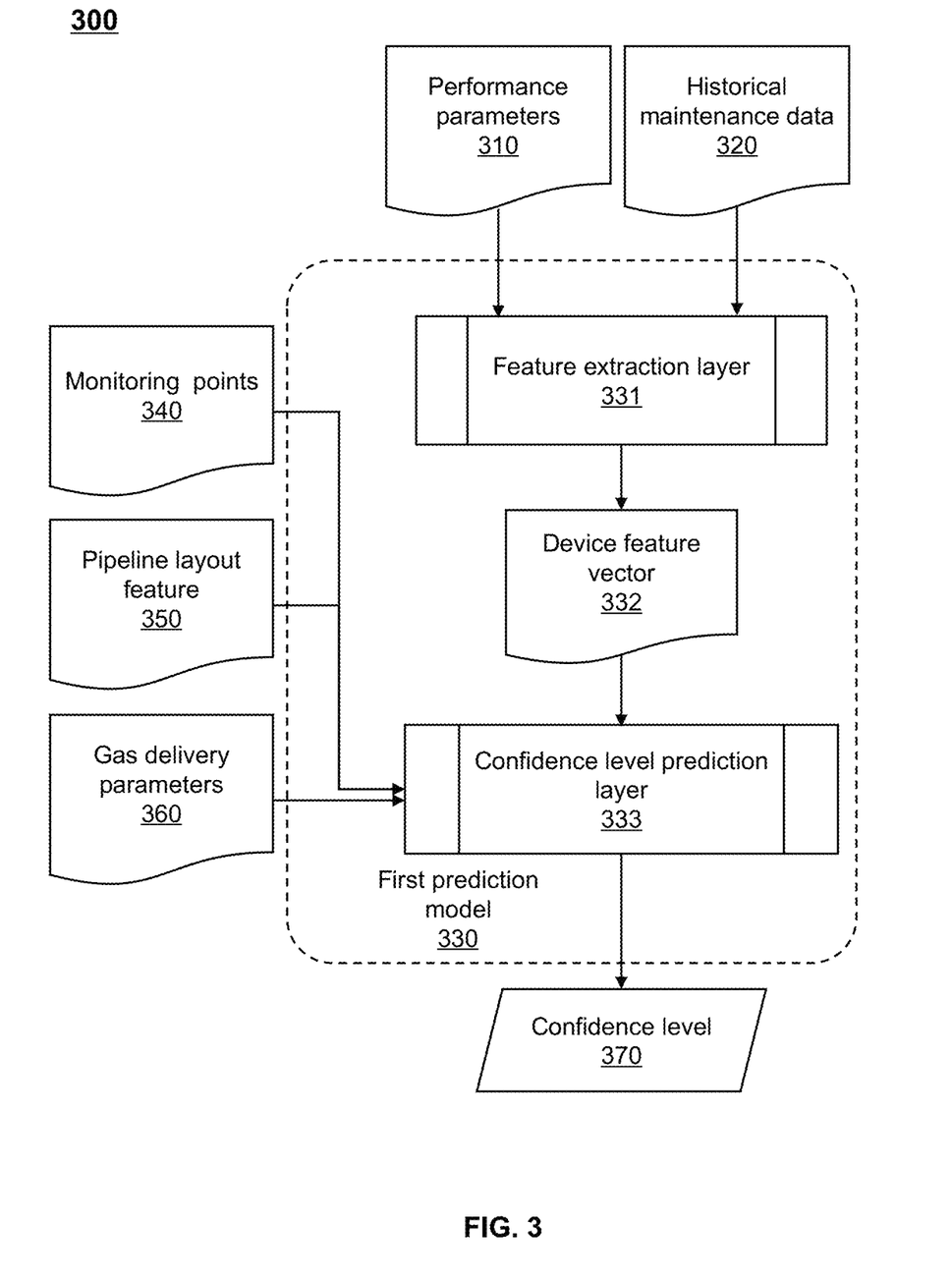
FIG. 3 is a schematic diagram of determining a confidence level of an estimated gas loss rate according to some embodiments of the present disclosure.

FIG. 3 is a schematic diagram of determining a confidence level of an estimated gas loss rate according to some embodiments of the present disclosure. As shown in FIG. 3, the process 300 for determining a confidence level of an estimated gas loss rate includes the following contents.

In some embodiments, a smart gas device management platform may determine a confidence level 370 based on metering device data and gas delivery parameters using a first prediction model 330.

In some embodiments, the first prediction model may be a machine learning model.

For more information on the gas delivery parameters, please refer to the relevant description in FIG. 2.

The metering device data refers to data related to the gas metering device. For example, the metering device data may include performance parameters 310 of the gas metering device, historical maintenance data 320 of the gas metering device, or the like.

For more information on the performance parameters of the gas metering device and the historical maintenance data, refer to the relevant description in FIG. 2.

The first prediction model 330 may be used to obtain the confidence level 370 of the estimated gas loss rate. In some embodiments, the first prediction model 330 may be a neural network model.

In some embodiments, an input of the first prediction model 330 may include the performance parameters 310 of the gas metering device, the historical maintenance data 320 of the gas metering device, monitoring points 340 of the gas pipeline branch, gas delivery parameters 360, a pipeline layout feature 350, and an output may include the confidence level 370 of the estimated gas loss rate.

In some embodiments, the smart gas device management platform may obtain the performance parameters and the historical maintenance data of the gas metering device from the gas metering device. In some embodiments, the smart gas device management platform may obtain the performance parameters and the historical maintenance data of the gas metering device from a storage device (e.g., a smart gas data center). In some embodiments, the smart gas device management platform may obtain the performance parameters and the historical maintenance data of the gas metering device from other data sources in any reasonable manner.

For more information on the gas delivery parameters, please refer to the related description in FIG. 2.

The monitoring points 340 may include a preset point location and an update point location. The preset point refers to an initial location of the gas metering device. The update point refers to an adjusted location of the preset point. For more information about the update point, please refer to the related description of FIG. 4.

In some embodiments, the monitoring points 340 may represent the location of at least one preset point and/or at least one update point in the form of a vector, where each element in the vector corresponds to the coordinates of the preset point or the update point.

In some embodiments, the first prediction model 330 may include a feature extraction layer 331 and a confidence level prediction layer 333.

The feature extraction layer 331 may be used to obtain a device feature vector 332 of the gas metering device. In some embodiments, the feature extraction layer 331 may be a machine learning model such as a recurrent neural network model. In some embodiments, an input of the feature extraction layer 331 may include the performance parameters 310 of the gas metering device and the historical maintenance data 320 of the gas metering device, and an output includes the device feature vector 332.

The device feature vector 332 is data reflecting the features of the gas metering device. For example, the device feature vector 332 may include data related to the collection features, maintenance features, and similar features of the gas metering device.

The confidence level prediction layer 333 may be used to determine the confidence level 370 of the estimated gas loss rate. In some embodiments, the confidence level prediction layer 333 may be a machine learning model, e.g., a support vector machine (SVM) or a deep neural network (DNN) model. In some embodiments, the input of the confidence level prediction layer 333 may include the device feature vector 332, the monitoring points 340 of the gas pipeline branch, the pipeline layout feature 350, and the gas delivery parameters 360, the output may include the confidence level 370 of the estimated gas loss rate.

The pipeline layout feature 350 is data used to reflect the features of the gas pipeline layout. For example, the pipeline layout feature 350 may include data related to connection relationships between gas pipeline branches.

The pipeline layout feature 350 may characterize the layout information of a gas pipeline network. For example, the pipeline layout feature 350 may include features of a gas pipeline, such as a safety level of a gas pipeline connection point, identification and a delivery direction of a gas pipeline branch connection point, etc. The pipeline layout feature may also include a count of gas users on the gas pipeline, parameters (e.g., a length, a diameter, etc.) of the gas pipeline, and the historical maintenance data of the gas pipeline, etc.

In some embodiments, the smart gas device management platform may obtain layout information of the gas pipeline network from the smart gas data center and determine the pipeline layout feature based on the layout information of the gas pipeline network. The layout information of the gas pipeline network may be obtained based on the smart gas object platform and sent to the smart gas data center via the smart gas sensor network platform. See FIG. 1 and its description for more details.

In some embodiments, the pipeline layout feature 350 may be a graph structure including nodes and edges, with the nodes characterizing gas pipeline connection points. The pipeline layout feature may be stored in the smart gas data center via storage in the form of a data table, a file, or the like.

The node characterizes a gas pipeline connection point between gas pipelines. The gas pipeline connection points may include at least locations where different gas pipeline branches intersect, inflection points of gas pipelines, etc. The node feature may reflect information about the connection relationship among a plurality of gas pipelines. For example, the node feature may include a safety level of a connected portion of the pipeline.

The edge characterizes a gas pipeline, for example, an edge existing between two directly connected gas pipelines. The edge feature may reflect information about the gas pipeline. For example, the edge feature may include a count of gas users on the pipeline, parameters of the gas pipeline, the historical maintenance data of the gas pipeline, or the like.

In some embodiments, the safety level may be determined by a count and performance of safety devices on the pipeline at the connection point. The higher the count and performance of the safety devices are, the higher the safety level may be. The safety device may include members, pumps, compressors, valves, or the like, of the pipeline branch. The performance of the safety device may include an ability to resist compression and corrosion, and the age of the device. In some embodiments, the safety level may be determined by a manual input.

In some embodiments, gas pipeline parameters refer to parameters of the gas pipeline. For example, the gas pipeline parameters may include a length, an inner diameter, a wall thickness, a material, or the like. The historical maintenance data for the gas pipeline may include maintenance intervals and the time of the last maintenance. In some embodiments, the gas pipeline parameters and the historical maintenance data for the gas pipeline may be determined based on a manual input.

In some embodiments of the present disclosure, the reasonableness and accuracy of determining the confidence level can be improved by considering the pipeline layout.

In some embodiments of the present disclosure, the efficiency of data processing and accuracy of the prediction can be further improved by setting the first prediction model as the feature extraction layer and the confidence level prediction layer, and processing the corresponding data through different layers separately.

In some embodiments, the first prediction model may be obtained by jointly training the feature extraction layer and the confidence level prediction layer based on a large number of first training samples with first labels. The first training samples for the joint training include sample performance parameters of a sample gas metering device on a sample gas pipeline branch, sample historical maintenance data, a sample preset point, sample gas delivery parameters, and a sample pipeline layout feature. The first label may include whether an abnormality occurs in the sample gas metering device.

The sample pipeline layout feature may be historical pipeline layout feature determined based on historical data, and nodes, node attributes, edges, and edge attributes of the historical pipeline layout feature are similar to the above description.

The first training sample may be obtained based on historical data. The first label may be obtained through manual or automated labeling. For example, a value of 0 or 1 may indicate the confidence level. For example, the sample gas metering device may be analyzed, if there is an abnormality, the first label is set to 0; and if there is no abnormality, the first label is set to 1.

By way of example, the joint training process may include: inputting the sample performance parameters of the sample gas metering device and the sample historical maintenance data of the first training samples into an initial feature extraction layer, obtaining an initial device feature vector output from the initial feature extraction layer, inputting the output of the initial feature extraction layer, the sample preset point, the sample gas delivery parameters, and the sample pipeline layout feature into an initial confidence level prediction layer to get the confidence level. Based on the output of the initial confidence level prediction layer and the first label, a loss function is constructed, and at the same time, the parameters of the initial feature extraction layer and the initial confidence level prediction layer are updated until an end condition is met and the training is completed. The end condition may be that the loss function is less than a threshold, converges, or the training period reaches a threshold.

In some embodiments of the present disclosure, the confidence level of the estimated gas loss rate can be efficiently and accurately evaluated by the first prediction model, achieving better results than direct evaluation and facilitating subsequent judgment of the gas loss rate. By utilizing joint training, the problem of obtaining labels for the confidence level prediction layer can be addressed when trained independently, thus improving the training effectiveness.

FIG. 4 is a schematic diagram of determining a gas loss rate according to some embodiments of the present disclosure. As shown in FIG. 4, a process 400 for determining a gas loss rate includes the following contents.

In some embodiments, the smart gas device management platform may update preset points and determine an update point 410 in response to the confidence level satisfying the update condition; determine an update confidence level 420 based on the update point 410 using the first prediction model 330; and determine a gas loss rate 520 by a predetermined manner based on a confidence level 430 and/or the update confidence level 420.

The update condition is a determination condition for evaluating whether to update a set of preset points. For example, the update condition may include that the confidence level of the estimated gas loss rate is below a confidence level threshold. The confidence level threshold may be a system default value or a value preset by a human.

If the confidence level corresponding to the preset points meets the preset condition, the location of set of the preset points may not be reasonable.

In some embodiments, the smart gas device management platform may randomly generate a movement distance for a sensor within a set of preset points on a gas pipeline branch, and issue a control instruction to cause the moving structure to move the sensor on the gas pipeline branch based on the movement distance to obtain a set of update points 410.

In some embodiments, the sensor is equipped with a moving structure that allows the sensor to slide within a predetermined range on the gas pipeline branch. The moving structure may be a gear slide, a belt drive, or the like.

In some embodiments, using the above-mentioned manner, the sensor of at least one monitoring point in at least one set of preset points can move separately to obtain at least one set of update points 410.

By moving the sensors, it is possible to reduce the impact of improperly selected points on the calculation of confidence level in the gas delivery parameters and improve the rationality and reliability of the confidence level.

In some embodiments, the smart gas device management platform may obtain the gas operating parameters of the update points 410 on the gas pipeline branch, based on the sensors of the update points 410, and may further determine the update confidence level 420 by the first prediction model 330 based on the update points 410, the gas operation parameters of the update points, the performance parameters of the gas metering device on the gas pipeline branch, the historical maintenance data of the gas metering device, the gas delivery parameters, and pipeline layout features.

For more information about the first prediction model, refer to the description of FIG. 3.

In some embodiments, the smart gas device management platform may determine the gas loss rate by a predetermined algorithm based on the aforementioned confidence level and/or update confidence level.

The predetermined algorithm refers to an algorithm for updating the gas loss rate. In some embodiments, the predetermined algorithm may be a predefined formula or mapping relationship, etc.

In some embodiments, the smart gas service platform may determine a composite confidence level 440 of an estimated gas loss rate 450 based on the confidence level 430 and/or the update confidence level 420 through a weighted average; determine an adjustment factor 460; determine a gas loss rate 520 based on the estimated gas loss rate 450 and the adjustment factor 460.

The composite confidence level 440 is a confidence level determined based on the confidence level 430 and the update confidence level 420. For example, the composite confidence level may be determined by calculating an average, which may be a weighted average, an arithmetic average, etc.

By determining the composite confidence level of the estimated gas loss rate, the impact on the confidence level due to improper point selection can be reduced, thereby improving the reasonableness and reliability of the confidence level.

In some embodiments, the weight may be correlated with a reliability level of the preset or update points, where the higher the reliability level is, the higher the weight is.

The reliability level refers to a degree of bending of the gas pipeline layout in the area where the preset points or update points are located. For example, the reliability level may be related to an average pipeline bending degree, an average pipeline droop degree, etc., of the gas pipeline branch. For example, the smaller the average pipeline bending degree and the average pipeline droop degree are, the higher the reliability level of the set of points may be.

In some embodiments, the pipeline bending degree and pipeline droop degree can be determined through manual input.

The area in which the preset point or the update point is located refers to an area that is within a preset range from the preset point or the update point. The preset range refers to a range of any area within a region that does not exceed a set distance threshold. For example, the preset range may be a range of a circular area with a preset point as a center and a distance threshold as a radius. In some embodiments, the preset range may also have various other shapes, such as triangles, quadrilaterals, or the like. The distance threshold may be set empirically or artificially.

In some embodiments, the smart gas device management platform may calculate the bending degree and drooping degree of a set of points in the pipeline to determine the average pipeline bending degree and the average drooping degree. The corresponding weight may be determined based on the average pipeline bending degree and the average drooping degree. The correspondence between the average bending degree, the average drooping degree, and the weights may be pre-set.

In some embodiments of the present disclosure, the greater the curvature of the pipeline in the area where the point is located, and the more tilted or vertical the pipeline is, the greater the gas impact on the pipeline, the more significant the impact on the readings of the sensor, and the higher the likelihood of introducing errors into the sensor's readings, resulting in lower reliability. By appropriately reducing the weight of the confidence level with lower reliability, the weighted confidence level can be more accurate and reasonable.

In some embodiments, the smart gas device management platform may determine an adjustment factor 460 based on the composite confidence level 440 and adjust the estimated gas loss rate based on the adjustment factor 460 to determine the gas loss rate 520.

The adjustment factor 460 is a weighting factor for the estimated gas loss rate. The adjustment factor may be set based on actual demand.

In some embodiments, the smart gas service platform may preset a correspondence between different composite confidence levels 440 and the adjustment factor 460 to determine the adjustment factor based on a lookup table.

In some embodiments, the smart gas service platform may determine the gas loss rate 520 based on the estimated gas loss rate 450 and the adjustment factor 460. In some embodiments, the smart gas service platform may determine the gas loss rate based on formula (1):

$$S = k \cdot S_0 \tag{1}$$

wherein S denotes the gas loss rate, $S_0$ denotes the estimated gas loss rate, and k denotes the adjustment factor.

In some embodiments, the smart gas device management platform may, in response to a range of a plurality of confidence levels exceeding a difference threshold, abandon the calculation of the gas loss rate of the gas pipeline branch and set the gas loss rate of the gas pipeline branch to be 0. The plurality of confidence levels include confidence levels and update confidence levels corresponding to various points on the same gas pipeline branch.

The difference threshold refers to a threshold condition of the range of the confidence levels. The difference threshold may be a default value or a manually preset value. The range may be defined as a difference between the maximum and minimum values in the confidence levels.

Although the confidence levels corresponding to different points may vary, in the case of measuring the same gas pipeline branch at a plurality of sets of point and when there is no leakage failure in the gas pipeline, the difference between the confidence levels of the plurality of sets of points may be smaller than the difference threshold.

Therefore, when the range is greater than the difference threshold, it means that there may be a gas leakage or other abnormal situation at this time, and the gas pipeline branch needs to be manually inspected or checked for abnormalities. At this time, there is no need to adjust the pressure of the gas pipeline branch, and the gas loss rate of the gas pipeline branch is set to 0.

In some embodiments of the present disclosure, by comparing the range with the difference threshold, it can be determined whether there is an abnormal situation (e.g., a leakage fault) in the gas pipeline, thereby reducing the computational workload and improving computational efficiency of the IoT system.

In some embodiments of the present disclosure, the confidence level of the estimated gas loss rate is determined by collecting gas delivery parameters from the plurality of sets of different points and calculating the weighted average of the confidence levels. This approach can reduce the impact of improper point selection on the confidence level, thus further improving its rationality and reliability.

In some embodiments of the present disclosure, updating the preset points can reduce the influence of the location factor on the confidence level. Based on the confidence level and/or update confidence level, the gas loss rate can be determined using a predetermined method, thereby reducing the impact of the location on the gas loss rate and improves the calculation accuracy of the gas loss rate.

Figure 5:
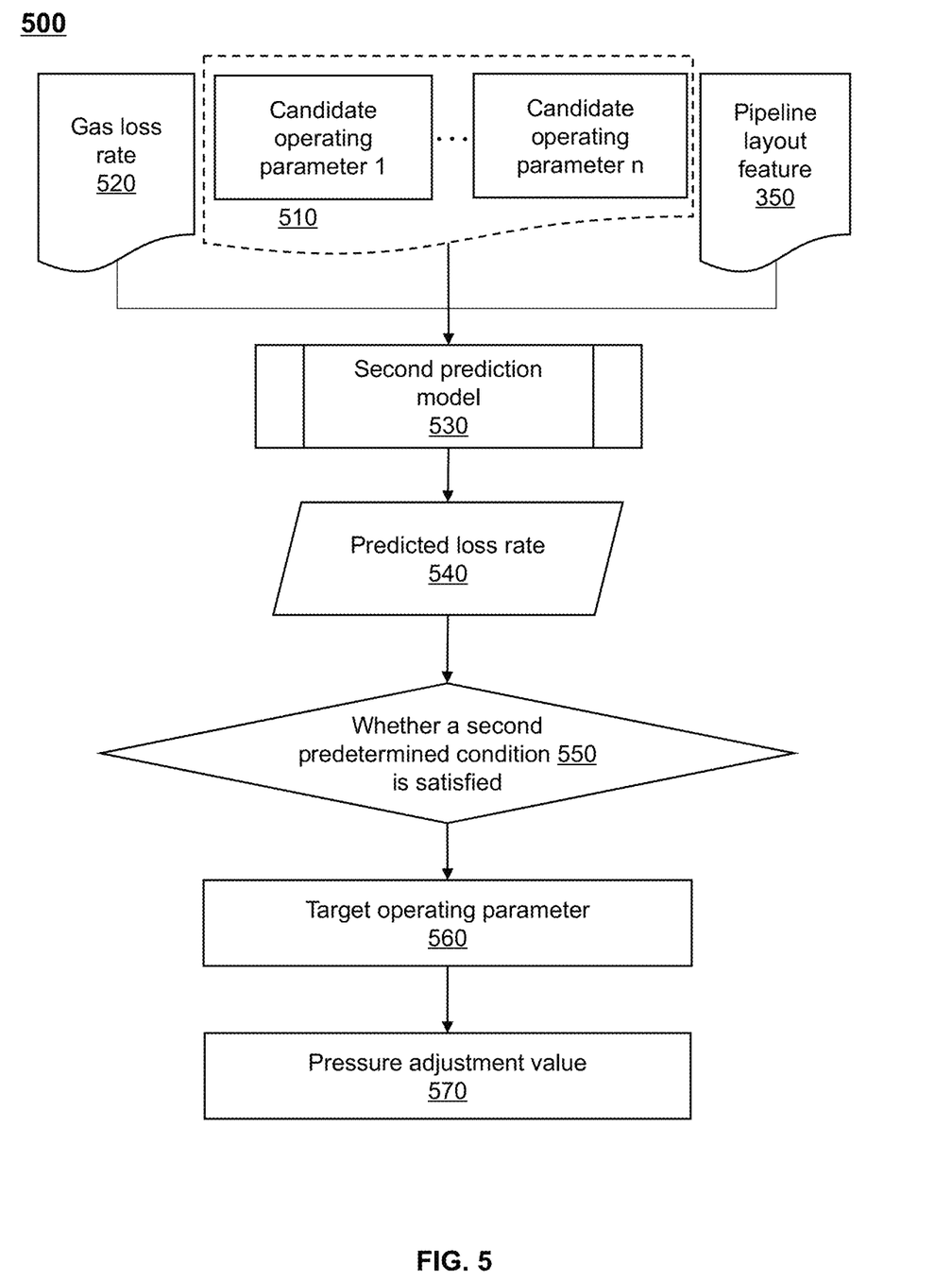
FIG. 5 is a schematic diagram of adjusting a pressure of a gas pipeline network according to some embodiments of the present disclosure.

FIG. 5 is a schematic diagram of adjusting a pressure of a gas pipeline network according to some embodiments of the present disclosure. As shown in FIG. 5, the process 500 for adjusting a pressure of a gas pipeline network includes the following steps.

In some embodiments, in response to the gas loss rate satisfying the first predetermined condition, the processor may generate at least one candidate operating parameter 510, predict a predicted loss rate 540 corresponding to each of the at least one candidate operating parameter via a second prediction model 530, determine a target operating parameter 560 based on a candidate operating parameter with a predicted loss rate satisfying a second predetermined condition 550 in the at least one candidate operating parameter; determine a pressure adjustment value 570 of the gas pipeline network based on the target operating parameter, and adjust the pressure of the gas pipeline network based on the pressure adjustment value 570.

The candidate operating parameters refer to candidate regulated pressures for a plurality of regulating stations in the gas pipeline network. The candidate operating parameters 510 may be generated in various ways. For example, the processor may randomly add or subtract a value in a range of 10-100 Pa from an original operating parameter. By executing the above operation n times, n candidate operating parameters may be generated. As another example, the processor may generate the candidate operating parameters based on historical adjustment data.

The predetermined condition refers to a threshold condition related to the gas loss rate. The preset condition may include a first predetermined condition and a second predetermined condition.

In some embodiments, the first predetermined condition includes one of the following conditions: 1) the gas loss rate of a single pipeline branch is greater than a first threshold; 2) the weighted average of gas loss rates of a plurality of pipeline branches is greater than a second threshold. The weighted is related to the confidence level of the gas loss rate, and the higher the confidence level is, the higher the weight is.

In some embodiments, the first threshold and the second threshold may be predetermined by a skilled person based on experience.

In some embodiments of the present disclosure, by weighted averaging gas loss rates of a plurality of pipelines based on the confidence level, the predicted result of the gas loss rate can be more accurate, enabling more accurate adjustment and improvement of operating parameters (e.g., gas pipeline pressure).

In some embodiments, the processor may determine the predicted loss rate corresponding to the candidate operating parameter using a second prediction model. The second prediction model may be a machine learning model.

In some embodiments, the second prediction model 530 may be a neural network (NN) model.

In some embodiments, an input of the second prediction model 530 may include the gas loss rate 520 corresponding to at least one gas pipeline branch in the gas pipeline network, the candidate operating parameter 510, and the pipeline layout feature 350, and an output may include the predicted loss rate 540.

A detailed description of the gas loss rate can be found in the corresponding explanation of FIG. 4, and a detailed description of the pipeline layout feature can be found in the corresponding explanation of FIG. 3. For each candidate operating parameter, the second prediction model 530 may output the predicted loss rate 540 for at least one gas pipeline branch of the gas pipeline network under the candidate operating parameter.

In some embodiments, the second prediction model may be trained based on a plurality of second training samples with second labels. For example, the plurality of second training samples with second labels are input into an initial second prediction model. A loss function is constructed based on the labels and the output result of the initial second prediction model. The parameters of the initial second prediction model are iteratively updated by gradient descent or other manners based on the loss function until the training is completed, and a trained second prediction model is obtained. The end condition may include the convergence of the loss function, a count of iterations reaching a threshold, etc.

In some embodiments, the second training samples and second labels may be determined based on historical operating data of the gas pipeline network. The second training samples may include at least an initial gas loss rate, an adjusted value of a historical operating parameter, and a historical pipeline layout feature of at least one gas pipeline branch in the historical data. The second label may be a gas loss rate of an adjusted operating parameter in historical data.

In some embodiments of the present disclosure, predicting adjusted predicted loss rate can help identify improved the target operating parameter.

In some embodiments, the processor may select the candidate operating parameter with a predicted loss rate satisfying the second predetermined condition as the target operating parameter.

The target operating parameter refers to a finalized regulated pressure for a plurality of regulating stations in the gas pipeline network. The target operating parameter maybe determined based on the predicted loss rate output by the second prediction model and the second predetermined condition. For example, if the predicted loss rate satisfies the second predetermined condition, the corresponding candidate operating parameter is taken as the target operating parameter. If there are a plurality of candidate operating parameters that satisfy the second predetermined condition, the target operating parameter may be randomly selected. Alternatively, the candidate operating parameter with a gas loss rate satisfying a third predetermined condition may be chosen as the target operating parameter for final execution. In this regard, the third predetermined condition may include minimizing the average predicted loss rate of at least one gas pipeline branch in the gas pipeline network.

In some embodiments, the second predetermined condition includes that the gas loss rate of each gas pipeline branch in the gas pipeline network is less than or equal to a first threshold, and the weighted average of the gas loss rates of at least one gas pipeline branch is less than or equal to the second threshold. The weight is related to the confidence level of the gas loss rate, where the higher the confidence level is, the greater the weight is.

In some embodiments, the smart gas service platform may determine an adjustment value of the pressure of the gas pipeline network based on the target operating parameter, and based on the pressure adjustment value of the gas pipeline network, adjust the pressure of the gas delivery through the pressure regulating device in the gas pipeline network.

In some embodiments of the present disclosure, when the gas loss rate does not satisfy the first predetermined condition, the target operating parameter is obtained by the second prediction model and the second predetermined condition, and then the pressure of the gas pipeline network is adjusted based on the target operating parameter, which helps optimize the operation parameters and reduce the gas loss rate during the delivery process.

One or more embodiments of the present disclosure further provide a device for gas loss control based on a smart gas platform, including a processor, the processor being used to execute the method for gas loss control based on a smart gas platform as described in any of the above embodiments.

One or more embodiments of the present disclosure further provide a non-transitory computer-readable storage medium. The storage medium stores computer instructions, and when reading the computer instructions in the storage medium, a computer executes the method for gas loss control based on a smart gas platform as described in any of the above embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein.

Moreover, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

Finally, it should be understood that the embodiments described in the present disclosure are only used to illustrate the principles of the embodiments of the present disclosure. Other variations may also fall within the scope of the present disclosure. Accordingly, the embodiments of the present disclosure are not limited to the embodiments introduced and described in the present disclosure explicitly.

What is claimed is:

1. A method for adjusting a pressure of a smart gas pipeline network executed by a smart gas device management platform of an Internet of Things (IoT) system for adjusting a pressure of a smart gas pipeline network, wherein the IoT system includes a smart gas user platform, a smart gas service platform, the smart gas device management platform, a smart gas sensor network platform, and a smart gas object platform, the smart gas object platform is configured to obtain gas delivery parameters and gas data, and upload the gas delivery parameters and the gas data to a smart gas data center of the smart gas device management platform through the smart gas sensor network platform, and the method comprises:

obtaining gas delivery parameters of a preset point in a gas pipeline branch;

obtaining gas data corresponding to the gas pipeline branch, the gas data including at least a total amount of gas supply and a total amount of gas consumption;

determining an estimated value of a gas loss rate of the gas pipeline branch based on the total amount of gas supply and the total amount of gas consumption;

determining a confidence level of the estimated value based on the gas data and the gas delivery parameters;

in response to the confidence level satisfying an update condition, updating the preset point to determine an update point;

determining an update confidence level through a first prediction model based on the update point, the first prediction model being a machine learning model and being obtained based on a training of an initial feature extraction layer and an initial confidence level prediction layer; wherein the first prediction model includes a feature extraction layer and a confidence level prediction layer; wherein an input of the feature extraction layer includes at least a performance parameter and historical maintenance data of a gas metering device, and an output of the feature extraction layer includes a device feature vector of the gas metering device; and
an input of the confidence level prediction layer includes at least the device feature vector, the preset point, the gas delivery parameters, and a pipeline layout feature, and an output of the confidence level prediction layer includes the confidence level;
determining a composite confidence level of the estimated value based on at least one of the confidence level or the update confidence level through a weighted average;
determining an adjustment factor based on the composite confidence level;
determining the gas loss rate based on the estimated value and the adjustment factor, and sending the gas loss rate to the smart gas user platform through the smart gas service platform; and
in response to the gas loss rate satisfying a first predetermined condition, determining a target operating parameter, and adjusting a pressure of a gas network based on the target operating parameter.

2. The method according to claim 1, wherein the pipeline layout feature is a graph structure including nodes and edges, the nodes characterizing connection points between gas pipelines, node features including a safety level of the connection points; and the edges characterizing the gas pipelines, edge features including a count of gas users on the gas pipelines, parameters of the gas pipelines, and historical maintenance data of the gas pipelines.

3. The method according to claim 1, further comprising:
obtaining the first prediction model by jointly training the initial feature extraction layer and the initial confidence level prediction layer based on a large number of first training samples with first labels; wherein
the first training samples include sample performance parameters of a sample gas metering device on a sample gas pipeline branch, sample historical maintenance data, a sample preset point, sample gas delivery parameters, and a sample pipeline layout feature; and
the first labels include whether an abnormality occurs in the sample gas metering device.

4. The method according to claim 1, wherein a weight of the weighted average is positively correlated with a reliability level of the preset point or the update point.

5. The method according to claim 1, further comprising:
in response to a range of a plurality of confidence levels corresponding to a plurality of preset points exceeding a difference threshold, setting the gas loss rate of the gas pipeline branch to 0.

6. The method according to claim 1, wherein the in response to the gas loss rate satisfying a first predetermined condition, determining a target operating parameter includes:
in response to the gas loss rate satisfying the first predetermined condition, generating at least one candidate operating parameter;
predicting a predicted loss rate corresponding to each of the at least one candidate operating parameter based on a second prediction model, wherein the second prediction model is a machine learning model; and
determining the target operating parameter based on a candidate operating parameter with a predicted loss rate satisfying a second predetermined condition in the at least one candidate operating parameter.

7. The method according to claim 6, wherein the first predetermined condition includes at least one of:
a gas loss rate of a single pipeline branch is greater than a first threshold; or
a weighted average of gas loss rates of a plurality of pipeline branches is greater than a second threshold, wherein a weight of the weighted average is related to the confidence level of the gas loss rate, and the higher the confidence level, the greater the weight.

8. The method according to claim 6, wherein an input of the second prediction model includes at least the gas loss rate, the at least one candidate operating parameter, and a pipeline layout feature, and an output of the second prediction model includes the predicted loss rate.

9. An Internet of Things (IoT) system for adjusting a pressure of a smart gas pipeline network, comprising: a smart gas user platform, a smart gas service platform, a smart gas device management platform, a smart gas sensor network platform, and a smart gas object platform;
the smart gas object platform is configured to obtain gas delivery parameters and gas data, and upload the gas delivery parameters and the gas data to a smart gas data center of the smart gas device management platform through the smart gas sensor network platform, and
the smart gas device management platform is configured to:
obtain gas delivery parameters of a preset point in a gas pipeline branch;
obtain gas data corresponding to the gas pipeline branch, the gas data including at least a total amount of gas supply and a total amount of gas consumption;
determine an estimated value of a gas loss rate of the gas pipeline branch based on the total amount of gas supply and the total amount of gas consumption;
determine a confidence level of the estimated value based on the gas data and the gas delivery parameters;
in response to the confidence level satisfying an update condition, update the preset point to determine an update point;
determine an update confidence level through a first prediction model based on the update point, the first prediction model being a machine learning model and being obtained based on a training of an initial feature extraction layer and an initial confidence level prediction layer; wherein the first prediction model includes a feature extraction layer and a confidence level prediction layer; wherein
an input of the feature extraction layer includes at least a performance parameter and historical maintenance data of a gas metering device, and an output of the feature extraction layer includes a device feature vector of the gas metering device; and
an input of the confidence level prediction layer includes at least the device feature vector, the preset point, the gas delivery parameters, and a pipeline layout feature, and an output of the confidence level prediction layer includes the confidence level;
determine a composite confidence level of the estimated value based on at least one of the confidence level or the update confidence level through a weighted average;
determine an adjustment factor based on the composite confidence level;
determine the gas loss rate based on the estimated value and the adjustment factor, and send the gas loss rate to the smart gas user platform through the smart gas service platform; and in response to the gas loss rate satisfying a first predetermined condition, determine a target operating parameter, and adjust a pressure of a gas network based on the target operating parameter.

10. The IoT system according to claim 9, wherein the pipeline layout feature is a graph structure including nodes and edges, the nodes characterizing connection points between gas pipelines, node features including a safety level of the connection points; and the edges characterizing the gas pipelines, edge features including a count of gas users on the gas pipelines, parameters of the gas pipelines, and historical maintenance data of the gas pipelines.

11. The IoT system according to claim 9, wherein the smart gas device management platform is configured to:
obtain the first prediction model by jointly training the initial feature extraction layer and the initial confidence level prediction layer based on a large number of first training samples with first labels; wherein
the first training samples include sample performance parameters of a sample gas metering device on a sample gas pipeline branch, sample historical maintenance data, a sample preset point, sample gas delivery parameters, and a sample pipeline layout feature; and
the first labels include whether an abnormality occurs in the sample gas metering device.

12. The IoT system according to claim 9, wherein a weight of the weighted average is positively correlated with a reliability level of the preset point or the update point.

13. The IoT system according to claim 9, wherein the smart gas device management platform is configured to: in response to a range of a plurality of confidence levels corresponding to a plurality of preset points exceeding a difference threshold, set the gas loss rate of the gas pipeline branch to 0.

14. The IoT system according to claim 9, wherein the smart gas device management platform is configured to:
in response to the gas loss rate satisfying the first predetermined condition, generate at least one candidate operating parameter;
predict a predicted loss rate corresponding to each of the at least one candidate operating parameter based on a second prediction model, wherein the second prediction model is a machine learning model; and
determine the target operating parameter based on a candidate operating parameter with a predicted loss rate satisfying a second predetermined condition in the at least one candidate operating parameter.

15. The IoT system according to claim 14, wherein the first predetermined condition includes at least one of:
a gas loss rate of a single pipeline branch is greater than a first threshold; or
a weighted average of gas loss rates of a plurality of pipeline branches is greater than a second threshold, wherein a weight of the weighted average is related to the confidence level of the gas loss rate, and the higher the confidence level, the greater the weight.

16. The IoT system according to claim 14, wherein an input of the second prediction model includes at least the gas loss rate, the at least one candidate operating parameter, and a pipeline layout feature, and an output of the second prediction model includes the predicted loss rate.

\* \* \* \* \*